Aug. 10, 1965   R. L. EASTON   3,199,229
ORRERY-SATELLITE ORBIT DEMONSTRATION DEVICE
Filed Feb. 26, 1963
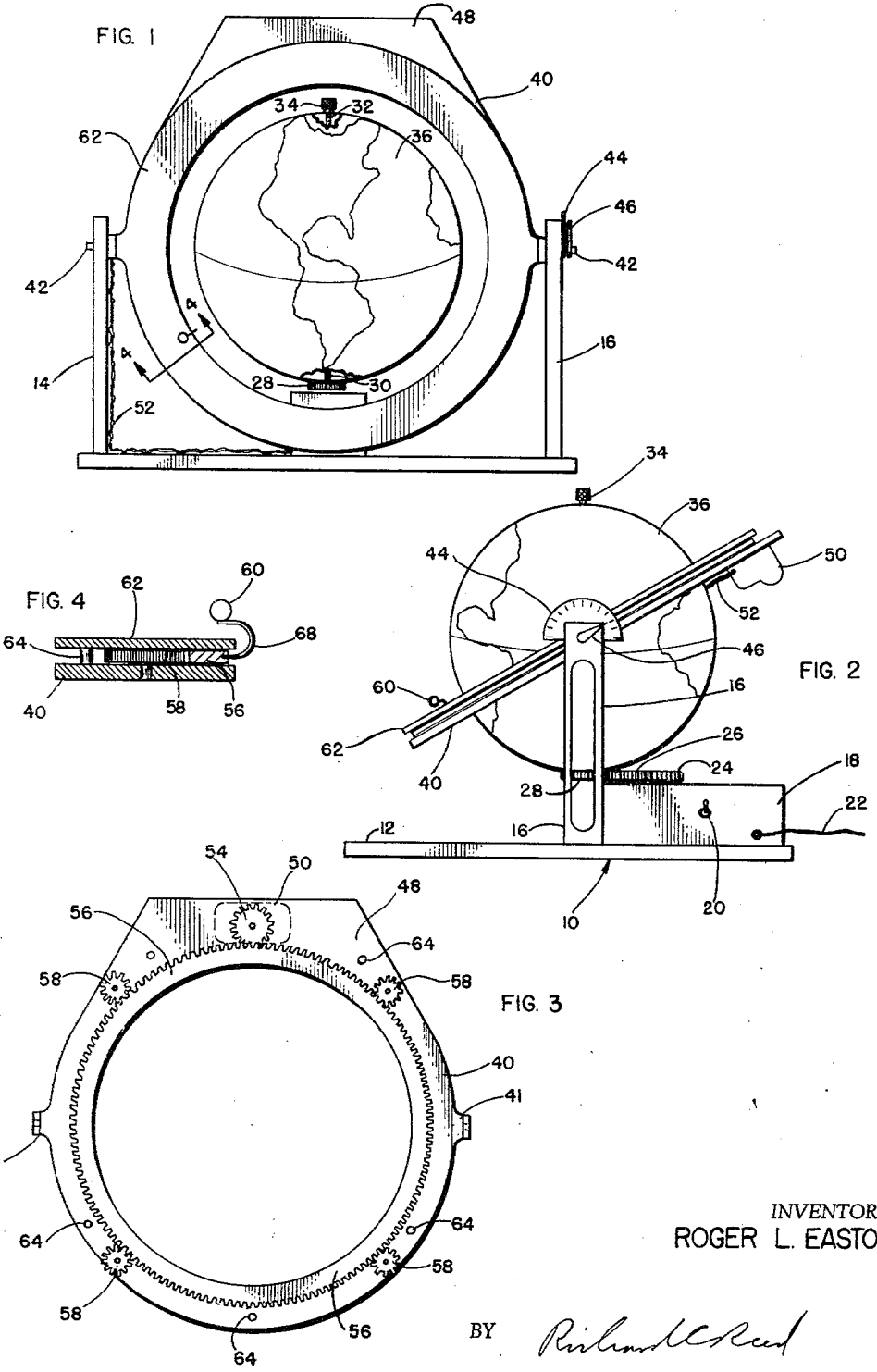
INVENTOR
ROGER L. EASTON
BY *Richard C. Reed*
ATTORNEY United States Patent Office 3,199,229
Patented Aug. 10, 1965

3,199,229
ORRERY-SATELLITE ORBIT DEMONSTRATION DEVICE
Roger L. Easton, Oxon Hill, Md.
(6566 Oxon Hill Road, Washington 21, D.C.)
Filed Feb. 26, 1963, Ser. No. 261,239
4 Claims. (Cl. 35—46)
(Granted under Title 35, U.S. Code (1952), sec. 266)

The invention described herein may be manufactured and used by or for the Government of the United States of America for governmental purposes without the payment of any royalties thereon or therefor.

This invention relates to orreries, and more particularly to an orrery for demonstrating the relative position of points on the earth's surface and a body orbiting therearound at any given time during orbit.

In the field of satellite display devices it has been the general practice to employ a stationary or rotating globe with a satellite on a long arm rotating thereabout. The old methods are in general either complicated, inaccurate, unable to handle all orbital examples, or a combination of some or all of these deficiencies.

The orrery of the present invention overcomes many of the difficulties of the prior art devices by providing for the demonstration of orbital movement of a satellite at any desired angle with respect to the earth's equator and further provides for an instantaneous or "at a glance" representation of the moving satellite's position with respect to geographical locations on the rotating earth's surface.

It is accordingly an object of the present invention to provide an improved and more versatile orrery than those presently available.

Another object is the provision of an orrery wherein the relative positions of the earth and a body orbiting therearound are continually and accurately displayed.

A further object of the present invention is to provide a satellite orbit demonstration device whereby the angle of the orbit relative to the earth's equator may be accurately duplicated for substantially all orbital paths.

Other objects and many of the attendant advantages of this invention will be readily appreciated when the following detailed description is considered in conjunction with the accompanying drawings in which:

FIG. 1 is a front view of the orrery of the present invention with the globe partially broken away at the poles.

FIG. 2 is a side view of the satellite demonstration device of the present invention.

FIG. 3 is a top plan view of the satellite carrying plate and associated driving mechanism with the cover plate removed.

FIG. 4 is a section view taken along the line 4—4 of FIG. 1.

In the illustrated embodiment of the invention and referring more particularly to FIGS. 1 and 2, the orrery includes a support generally designated 10 including a base or frame member 12 and a pair of upwardly extending parallel arm members 14 and 16 secured in a position normal to the plane of the base member 12, as by welding. A conventional electric motor covered by a housing 18 is mounted on said base member 12 and operated through an "on-off" switch 20 by means of common 115 volt A.C. current in line 22. The motor within housing 18 drives a first gear 24 in reduction gear train 24–26–28. An elongated upright spindle 30 is carried by gear 28 at its axis of rotation, said spindle 30 being threaded at its upper end 32 to receive a securing nut 34.

A globe 36 representing the earth or some other body of the planetary system is mounted on spindle 30 so that said spindle represents and is coincident with the axis of rotation of said body, said body resting at its lower end on gear 28. When nut 34 is threaded onto spindle 30 globe 36 is thereby secured between the nut 34 and the upper surface of gear 28 by compressive force and hence will rotate with gear 28 about the theoretical axis of rotation of said globe. Should it be desired to rotate the globe independent of the driving gear train the nut 34 may be unthreaded slightly to remove the compressing or binding force and the globe rotated by hand to a desired index or starting position relative to a satellite or other orbiting body to be later described. Upon retightening nut 34 the globe will then rotate with gear 28. In the illustrated embodiment gear train 24–26–28 will rotate gear 28 once in twenty-four hours to duplicate the rotation of the earth about its axis. Of course, it will be apparent that the phenomenon demonstrated by the device is purely one of relativity and so long as the relative speed of rotation of the globe with respect to the speed of the orbiting body is accurate any rotative speed may be imparted to gear 28 within the scope of the present invention.

An annular plate 40 is mounted for rotative movement by means of integral angular lugs 41 and pins 42 in the openings in the upper ends of arms 14 and 16. Pins 42 and the openings provide for frictionally resisted rotative movement of annular plate 40 around globe 36 about an axis perpendicular to rotative axis of the globe and bisecting said globe axis at the midpoint thereof. In other words, if the globe represents the earth, as shown in the illustrated embodiment, the axis of rotation of plate 40 lies in a plane defined by the earth's equator 38, thus providing for substantially all orbital courses to be demonstrated by permitting plate 40 representing the satellite's path to be positioned at any desired angle to the equtaor 38.

A protractor 44 is securely mounted on arm 16, as by cement or similarly, in a fixed position with the base thereof lying in a plane defined by the equator of the globe. An indicator or pointer 46 is secured to pin 42 for rotation with plate 40 to indicate on protractor 44 the angle of plate 40 with respect to the equator 38 displayed on globe 36.

Annular plate 40 is in the shape of a ring having an enlarged or extended quadrant 48 in the form of a truncated triangle. The enlarged portion 48 carries on the back or bottom side thereof an electric variable speed motor 50 also operated by "on-off" switch 20. Motor 50 is connected to input line 22 and switch 20 by an electrical conduit 52 running from housing 18 along the top surface of base 12, up the inner side of arm 14 and along the back of plate 40 to motor 50. Sufficiently flexibility or play is left in conduit 52 at the juncture of arm 14 and plate 40 to provide for unobstructed rotative movement of plate 40.

On the top surface or front of plate 40 in the enlarged portion 48 is mounted a gear 54 which is directly driven by electric motor 50. Gear 54 in turn drives a floating ring gear 56 mounted on a plurality of freely rotating centering gears 58 which maintain the center of rotation of ring gear 56 coincident with the intersection of the longitudinal axis of pins 42 and the longitudinal axis of spindle 30.

Alternatively, motor 50 may be a constant speed electric motor selectively positionable on the back of plate 40 through radial movement toward and away from ring gear 56 and adapted to receive driving gears 54 of varying size.

The inner surface of ring gear 56 is provided with a plurality of small holes for forcibly receiving one leg of a substantially U-shaped wire member 68 having a spherical or otherwise shaped body 60 secured to its other leg representing a satellite or similar orbiting body. A cover plate 62 is mounted on and spaced from base plate 40 by means of a plurality of spacers 64. As shown in FIG. 4, cover plate 62 overlies ring gear 56, centering gears 58, and driving gear 54 to hide that mechanism from view (FIG. 1) and curved or U-shaped wire member 68 permits the simulated satellite 60 to be viewed against the background of cover plate 62 while being driven by the hidden ring gear 56.

In operation, base plate 40 and pins 42 are rotated in openings 43 in arms 14, 16, to the desired position as indicated by pointer 46 on protractor 44, the angle indicated will be the angle of the plane of annular base plate 40 with the plane of the equator of the globe and will duplicate the actual angle of the orbital path of an actual satellite or other body whose orbit is to be duplicated. The frictional fit of pins 42 in holes 43 will cause annular plate 40 to remain in the set position. Nut 34 is then loosened and globe 36 rotated to a position in which a particular geographical location on the globe is adjacent the simulated satellite 60 and nut 34 is then tightened to compressively hold globe 36 between the bottom surface of nut 34 and the upper face of gear 28. When the actual orbiting body whose flight is to be simulated reaches an orbital position over the earth duplicated by the preset relationship of the globe and satellite of the present invention, switch 20 is actuated, motor 18 commences to rotate globe 36 and motor 50 commences to drive satellite 60 in its orbital path at rates which will at all times demonstrate the actual position of the orbiting satellite with respect to the earth.

In the illustrated embodiment the globe was rotated once every 24 hours and the satellite made one complete orbit every 90 minutes. Of course, it is not necessary to duplicate an actual satellite orbit; the present invention is also susceptible to demonstrate proposed orbital paths and speeds for purposes of study, and any relative speeds of earth rotation and satellite orbit can be demonstrated by the present invention without departing from the scope thereof.

As can be seen from the foregoing description, the present invention offers a relatively simple and complete device for accurately demonstrating the relative position of a rotating planetary body and an object in orbit therearound.

Obviously many modifications and variations of the present invention are possible in light of the foregoing teachings and it is to be understood that the scope of this invention is to be limited only by the appended claims and not otherwise.

What is claimed is:

1. A device for demonstrating the relative movement between the earth and a satellite in orbit around said earth comprising:
    (a) a support including a base member and a pair of spaced, parallel, upwardly extending arms mounted on said base member at their lower ends,
    (b) a globe having a map of the earth superimposed thereon,
    (c) first driving means mounted on said base member between said arms including at least one gear, said globe being mounted on said gear for rotation therewith,
    (d) an annular plate encircling and spaced from said globe, mounted for pivotal movement on the upper ends of said arms about a pivotal axis lying in the plane of the equator of said earth globe,
    (e) a plurality of centering gears on said annular plate,
    (f) a ring gear floatingly mounted and centered by said centering gears,
    (g) second driving means including a driving gear mounted on said annular plate and positioned to drive said ring gear,
    (h) a simulated earth satellite secured to the inner face of said ring gear for movement in circular path about said globe, and
    (i) indicator means for indicating the angle of said annular plate with respect to a plane through the earth's equator whereby the relationship of the rotating earth and a moving earth satellite may be accurately displayed.

2. The device according to claim 1 wherein said indicator means includes a pointer rotatable with said plate and a protractor fixed to an arm of said support.

3. A device for demonstrating the relative movement between the earth and a satellite in orbit around said earth comprising:
    (a) a support member,
    (b) an earth simulating globe,
    (c) first driving means mounted on said support member and including at least one gear, said globe being mounted on said gear for rotation therewith,
    (d) an annular plate encircling said globe, and mounted for pivotal movement on said support member about a pivotal axis lying in the plane of the equator of said earth simulating globe,
    (e) a plurality of centering gears on said annular plate,
    (f) a ring gear floatingly mounted and centered by said centering gears,
    (g) second driving means including a driving gear mounted on said annular plate and positioned to drive said ring gear about its theoretical center,
    (h) a simulated earth satellite secured to the inner face of said ring gear for movement in a circular path about said globe, and
    (i) indicator means for indicating the angle of said annular plate with respect to the earth's equator whereby the relationship of the rotating earth and a moving earth satellite may be accurately displayed.

4. A device according to claim 3 wherein said globe is releasably mounted on said one gear to facilitate selective rotative movement of said globe relative to said one gear.

References Cited by the Examiner

UNITED STATES PATENTS

| | | | |
|---|---|---|---|
| 1,384,801 | 7/21 | Ferrari | 35—45 |
| 2,754,597 | 7/56 | Sylvester | 35—46 |
| 2,797,500 | 7/57 | Fisk. | |
| 3,028,687 | 4/62 | Johnson | 35—43 |

EUGENE R. CAPOZIO, *Primary Examiner.*

JEROME SCHNALL, *Examiner.*